United States Patent

Lambden

[11] Patent Number: 6,007,137
[45] Date of Patent: Dec. 28, 1999

[54] SIDE ACCESS TRUCK CAP

[76] Inventor: James Whitfield Lambden, R.R. #7 St. Mary's, Ontario, Canada, N4X-1C9

[21] Appl. No.: 08/898,292

[22] Filed: Jul. 22, 1997

Related U.S. Application Data

[63] Continuation-in-part of application No. 08/772,242, Dec. 13, 1996.

[30] Foreign Application Priority Data

Jul. 22, 1996 [GB] United Kingdom ......... 15330

[51] Int. Cl.⁶ .................................... B60P 3/34
[52] U.S. Cl. .................. 296/100.02; 296/100.06; 296/100.07; 296/165; 296/167
[58] Field of Search .............. 296/156, 164–165, 296/167, 56, 106, 901, 100.02, 100.06, 100.07, 100.08, 100.11, 206

[56] References Cited

U.S. PATENT DOCUMENTS

| | | | |
|---|---|---|---|
| 2,768,023 | 10/1956 | Landon | 296/164 |
| 2,886,375 | 5/1959 | Crawford | 296/100.07 |
| 3,637,252 | 1/1972 | Metsker | 296/164 |
| 4,756,571 | 7/1988 | Lake | 196/165 |
| 4,819,981 | 4/1989 | Moe et al. | 296/100.07 |
| 5,009,463 | 4/1991 | Saitoh et al. | 296/901 |
| 5,064,240 | 11/1991 | Kuss et al. | 296/100.08 |
| 5,072,984 | 12/1991 | Jackson | 296/56 |
| 5,104,175 | 4/1992 | Enninga | 296/156 |
| 5,104,177 | 4/1992 | Thomas, Jr. | 196/164 |
| 5,131,712 | 7/1992 | Heinz | 296/100.1 |
| 5,828,315 | 5/1989 | Muirhead | 296/10 |

FOREIGN PATENT DOCUMENTS

| | | | |
|---|---|---|---|
| 15419 | 9/1916 | United Kingdom | 296/102 |
| 1053482 | 1/1967 | United Kingdom | 296/165 |

*Primary Examiner*—Dennis H. Pedder

[57] ABSTRACT

An enclosure is described for the box of a pick-up truck. The box of a pickup truck is defined by a front wall, side walls and a rear gate the flat upper surfaces of the box forming a rectangle. The enclosure has a front wall, side walls and a rear gate which has a lower flange surface substantially congruent with the uppermost, outermost edge of the box, and mountable atop same. This defines a space enclosed by the box and an enclosure. The enclosure of the present invention is hinged internally within the defined space and is characterized in that between the other side wall of an enclosure of the invention and the corresponding side wall of a box is provided a pair of lifting arms to assist in the lifting, and closing, of said enclosure and a pair of latches to keep the enclosure in the lowermost closed position and is further defined by a weatherproof seal.

7 Claims, 17 Drawing Sheets

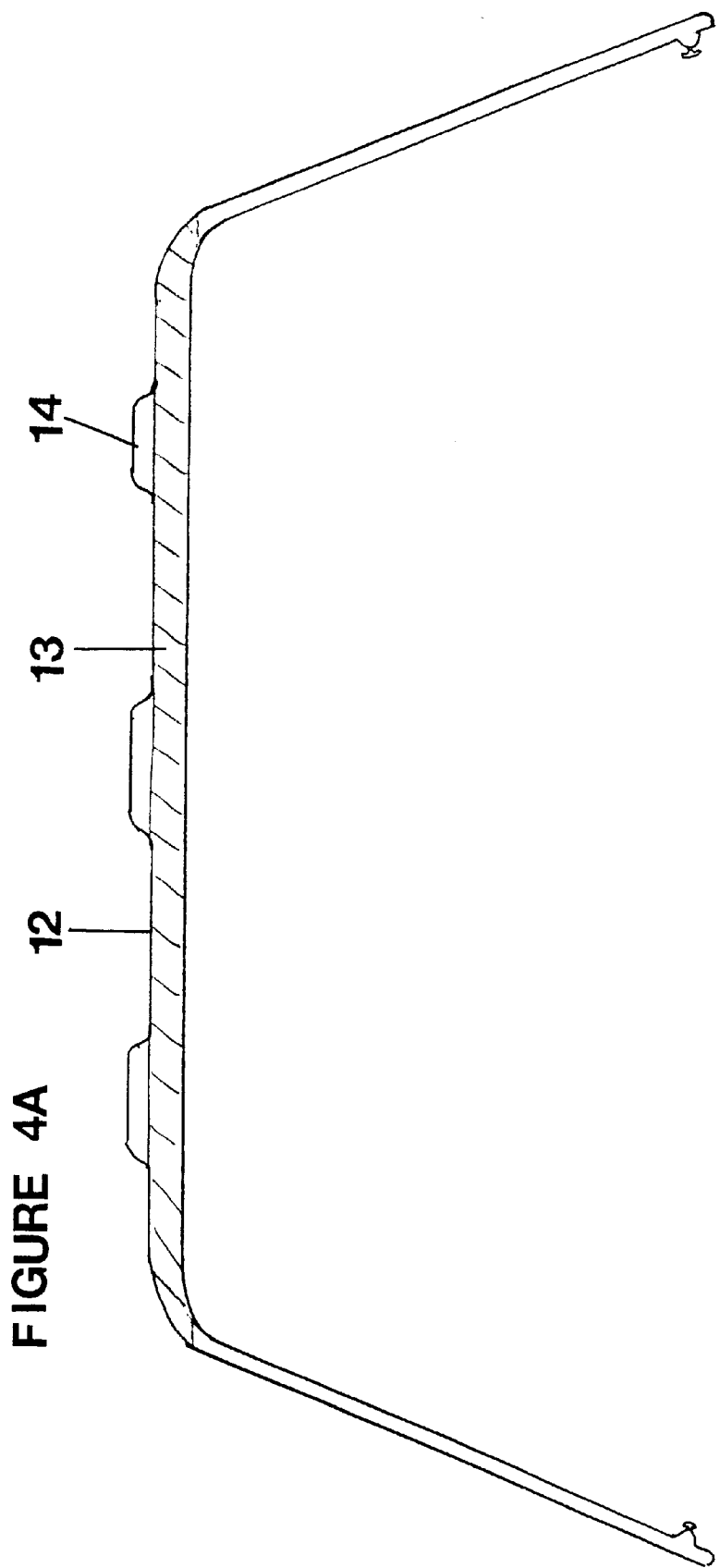

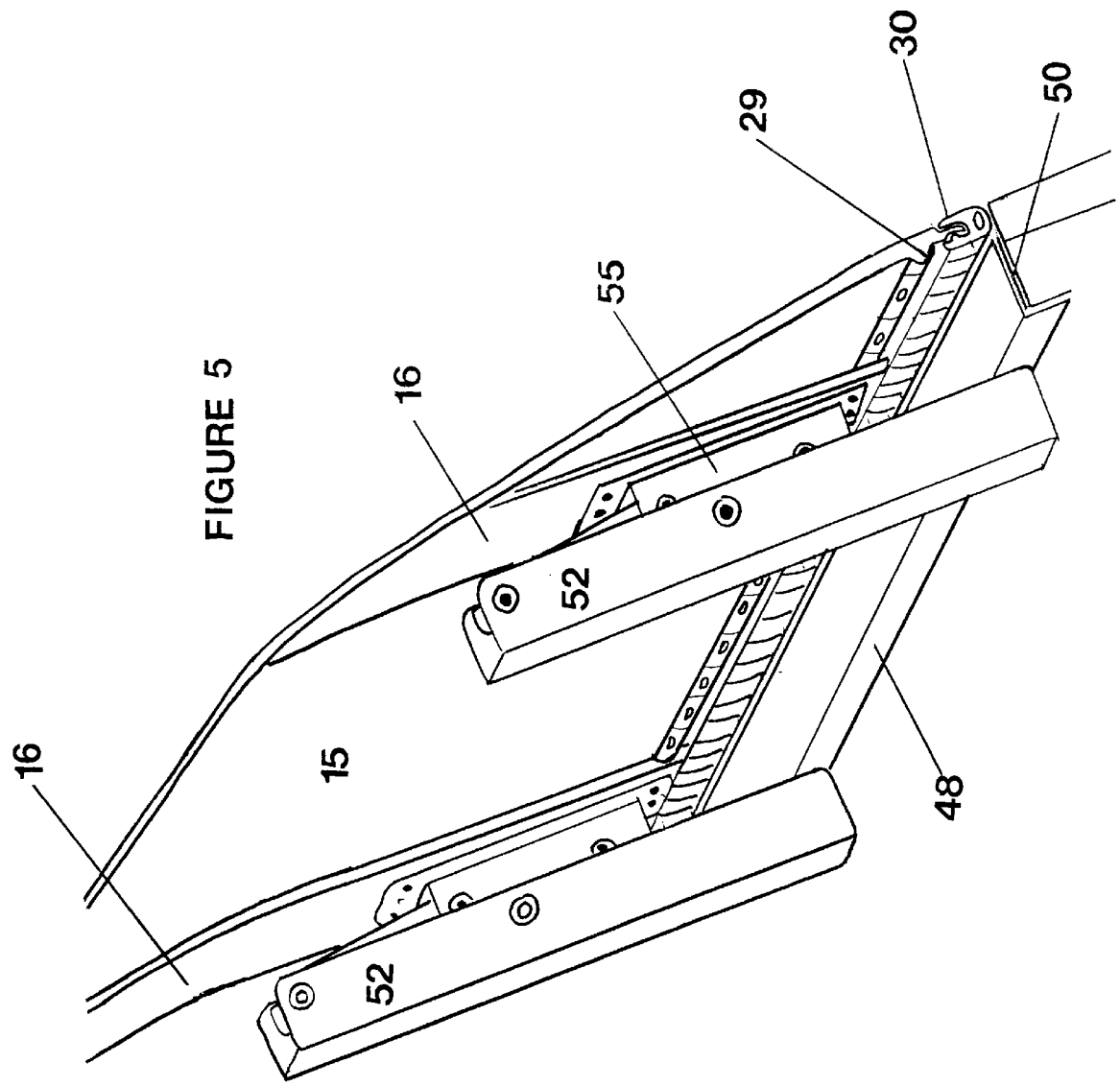

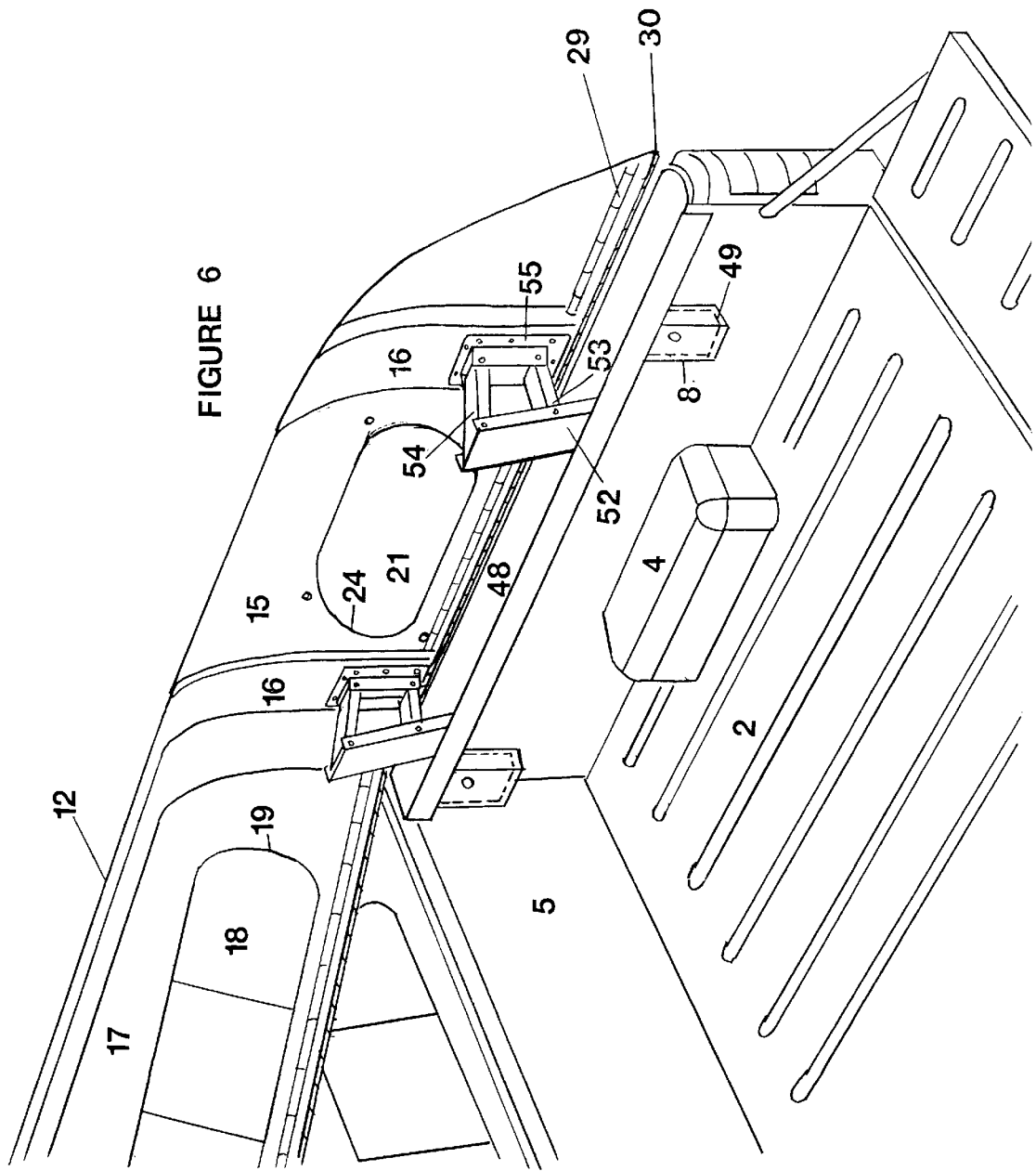

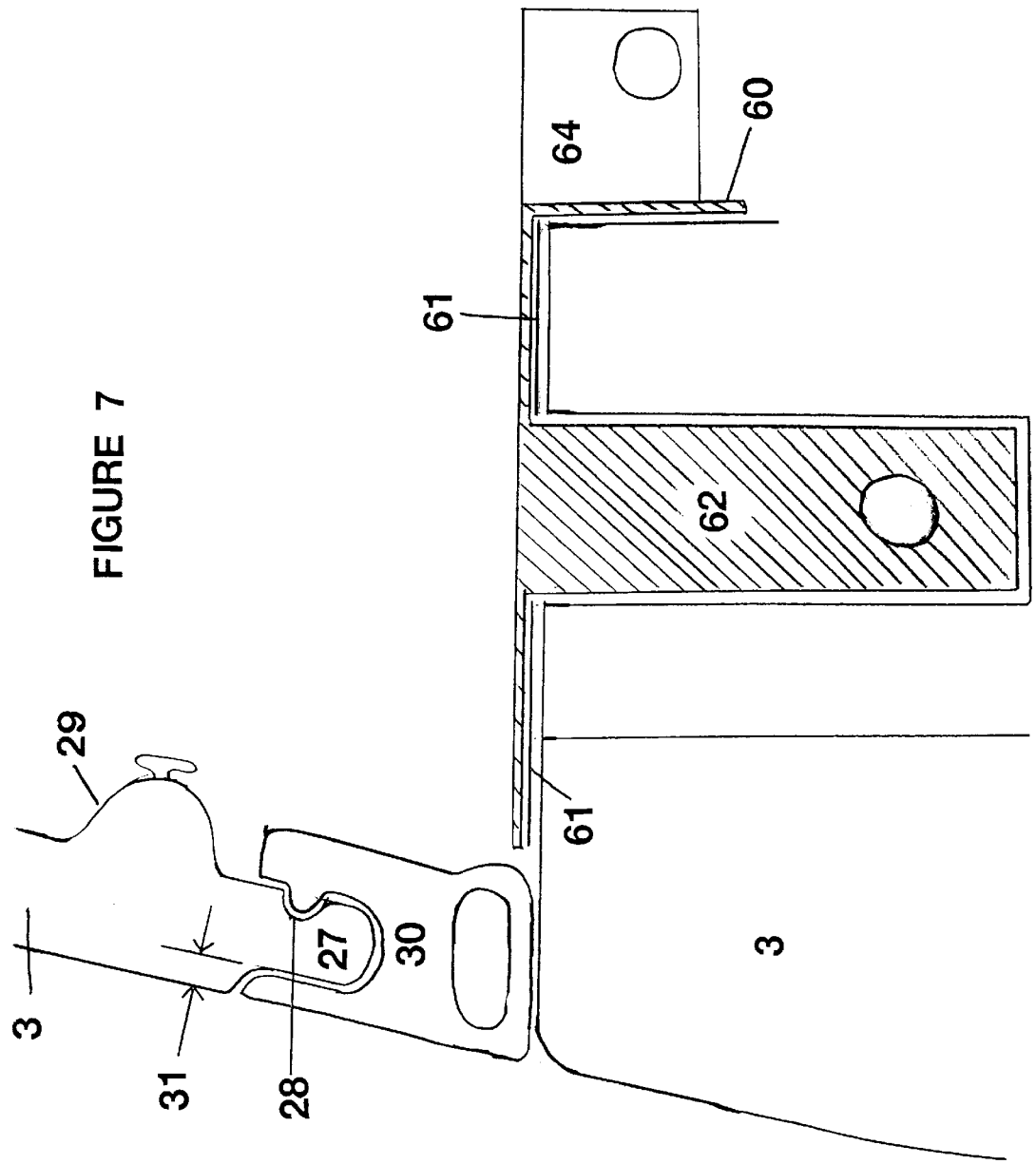

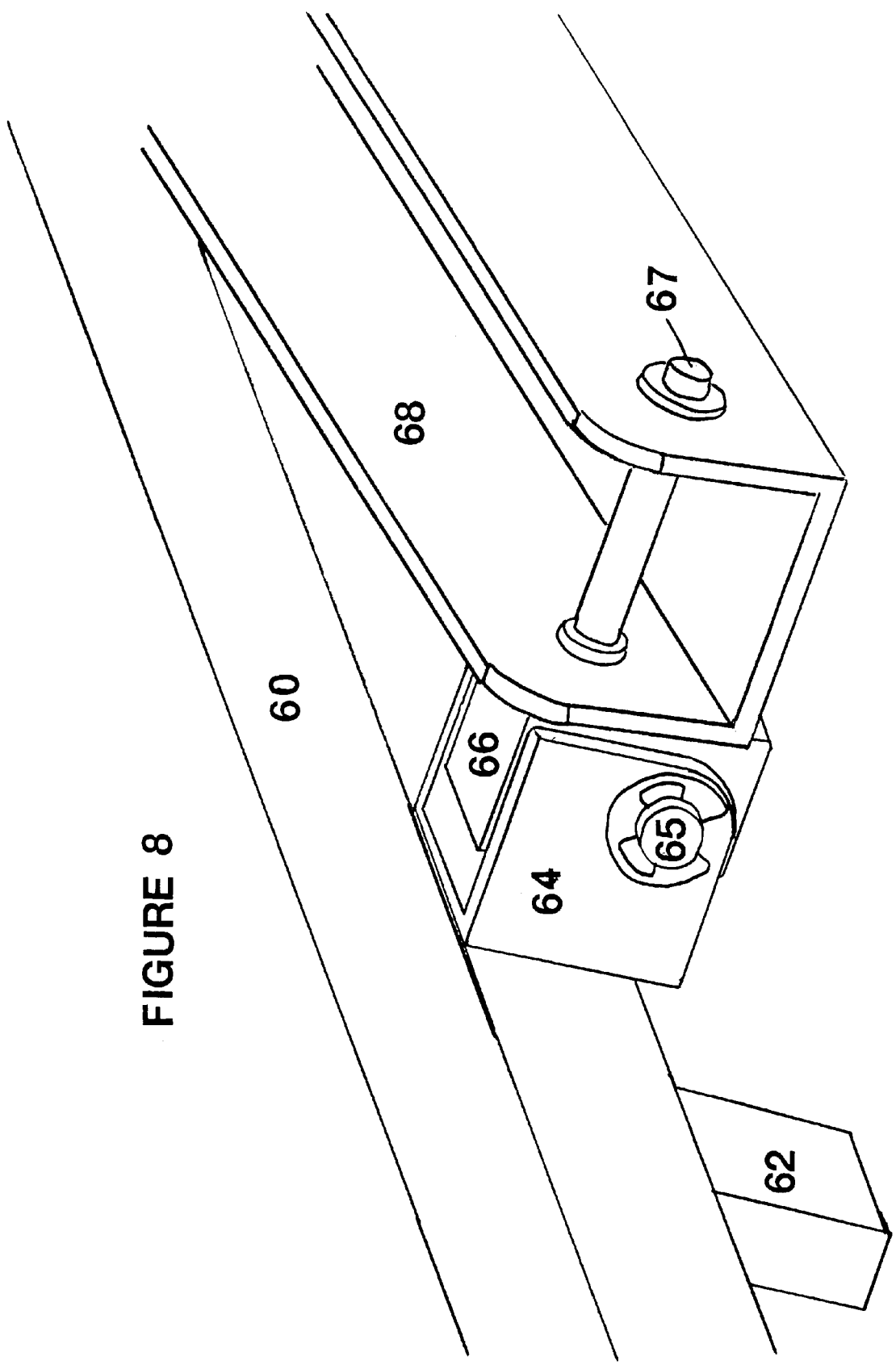

SIDE ACCESS TRUCK CAP

RELATED U.S. APPLICATION DATA

This is a continuation-in-part of U.S. application Ser. No. 08/772,242, filed on Dec. 13, 1996. priority date—Jul. 22, 1996.

FIELD OF THE INVENTION

The invention relates to truck caps for the cargo box of pickup trucks.

BACKGROUND OF THE INVENTION

Truck Caps or toppers are often used to secure the cargo box of pickup trucks. Truck caps are generally of the same height of the cab of the pickup truck making the enclosed area about half the height of the average person causing an operator to stoop over to access anything in the load bed of the pickup truck. To alleviate this problem, truck caps maintain or increase their height at the rear section of the cap, making the truck with cap less aerodynamic. Truck caps are fixedly mounted to and depend on the truck they are mounted on for their structural strength and are generally weak, heavy and do not maximize material properties in their construction. Truck caps incorporate an approximately vertical rear access door hingedly attached at its upper edge to provide the only access to the trucks' cargo area. These most common truck caps will hereinafter be referred to as conventional truck caps.

DESCRIPTION OF THE PRIOR ART

Pickup truck caps or toppers are commonly used to enclose the truck box of light pickup trucks. Normally they are fastened to the cargo box using nuts and bolts or clamp type devices. A variety of mechanisms have been invented to lift the cap up from the back or the side of the box employing hinges and catches in a vast array of attachment kits.

Most pickup truck caps manufactured today are dependent on the truck box for their structural integrity. Quite often they are manufactured using chopped fibreglass with lower perimeter rails manufactured from fibreglass over wood or aluminum base rails riveted onto the fibreglass. They make no allowances for being completely structurally indepedent, an absolute requirement for a cap to be lifted safely over the duration of its life span—typically up to 10 years.

Other inventions, particularly the one disclosed in U.S. Pat. No. 5,131,712 (Heinz) provide for a reinforcement kit inclusive of a torsion bar or other torsional reinforcement to the cap due to the unbalanced forces acting on the cap by their lifting mechanism. The patent disclosed in U.S. Pat. No. 5,102,185 (Lake) allows for the lifting of a truck topper hingedly attached at the upper edge of the forward wall of the cap. This invention allows for unimpeded access but requires a large and heavy frame to support the hinge. This invention opens under the power of a gas spring attached near the hinge creating a cantilever effect on the cap, requiring additional reinforcement of the cap.

Another invention disclosed in U.S. Pat. No. 5,018,777 allows for the cap to be opened from either side. In order to accomodate this function, it is necessary to have an external hinge point and then collapse the hinge on the opening side. Although it is desireable to open a cap from both sides, external hardware is not desireable as it becomes a protrusion on the outside surface of the cap. External hardware is also subject to corrosion from the elements.

Of overriding concern to the development of the lifting truck cap should be its overall safety under all conditions. A truck cap, when lifted, is an ideal wind scoop. The cap is continually subject to winds in excess of 55 miles per hour. Occasionally, high winds can remove a cap from its mounting position if its mounts fail or due to the failure of the fibreglass itself.

Another common disadvantage of caps covered by known patents in respect of add-on kits, is failure to optimize the efficiency of the materials being used. The kits have to be overly strong and as a consequence heavy. This also makes them relatively expensive to manufacture. Locking mechanisms are sometimes absent and some of the prior art requires the operator to supply a padlock. Still other patents require the drilling of holes in the pickup truck itself for an attachment means.

The invention herein aims to address the foregoing problems by providing an integrated cap and lifting mechanism.

SUMMARY OF THE INVENTION

In one broad aspect, then, the present invention relates to an enclosure for the box of a pick-up truck, said box being defined by a floor, front wall, sidewalls and a rear gate the flat upper surfaces of said box forming a rectangle, said enclosure having a roof, front wall, side walls and a rear gate and having a lower surface forming a substantially congruent rectangle with said box and mountable atop same to define a space enclosed by said box and said enclosure, said enclosure being hingedly attached along a selected side wall thereof to a corresponding side wall of said box, characterized in that between the other side wall of said enclosure and the corresponding sidewall of said box is provided with a pair of lifting arms to assist in the lifting, and closing, of said enclosure and a pair of latches to keep said enclosure in a closed position. When the cap is in its uppermost position, a flexible covering encloses the opened truck cap providing a weatherproof enclosure of increased volume for camping or working in.

The major objectives of the invention are to provide increased access to the cargo bed of a pickup truck in a safe and cost effective manner by utilizing material properties and the cap's shape. The invention addresses these objectives while encompassing a design which increases fuel economy and truck handling due to its lighter weight which results in a lowered centre of gravity as compared to trucks employing a conventional cap.

The above objectives and others will be described in more detail in the ensuing discussion of the preferred embodiment of the invention.

BRIEF DESCRIPTION OF THE DRAWINGS

FIG. 5 is a perspective view of the hinges in the closed position on a cutout section of the cap wall.

FIG. 6 is a perspective view of the hinges and hinge rail on a cut out section of the cap in the open position FIG. 7 is a cross section of the lift arm rail with stake pocket insert mounted atop a corresponding section of the truck box.

FIG. 8 is a perspective view of the lower swivel block of the hinge arm attached to the hinge rail.

DESCRIPTION OF THE PREFERRED EMBODIMENT

Figure 1:
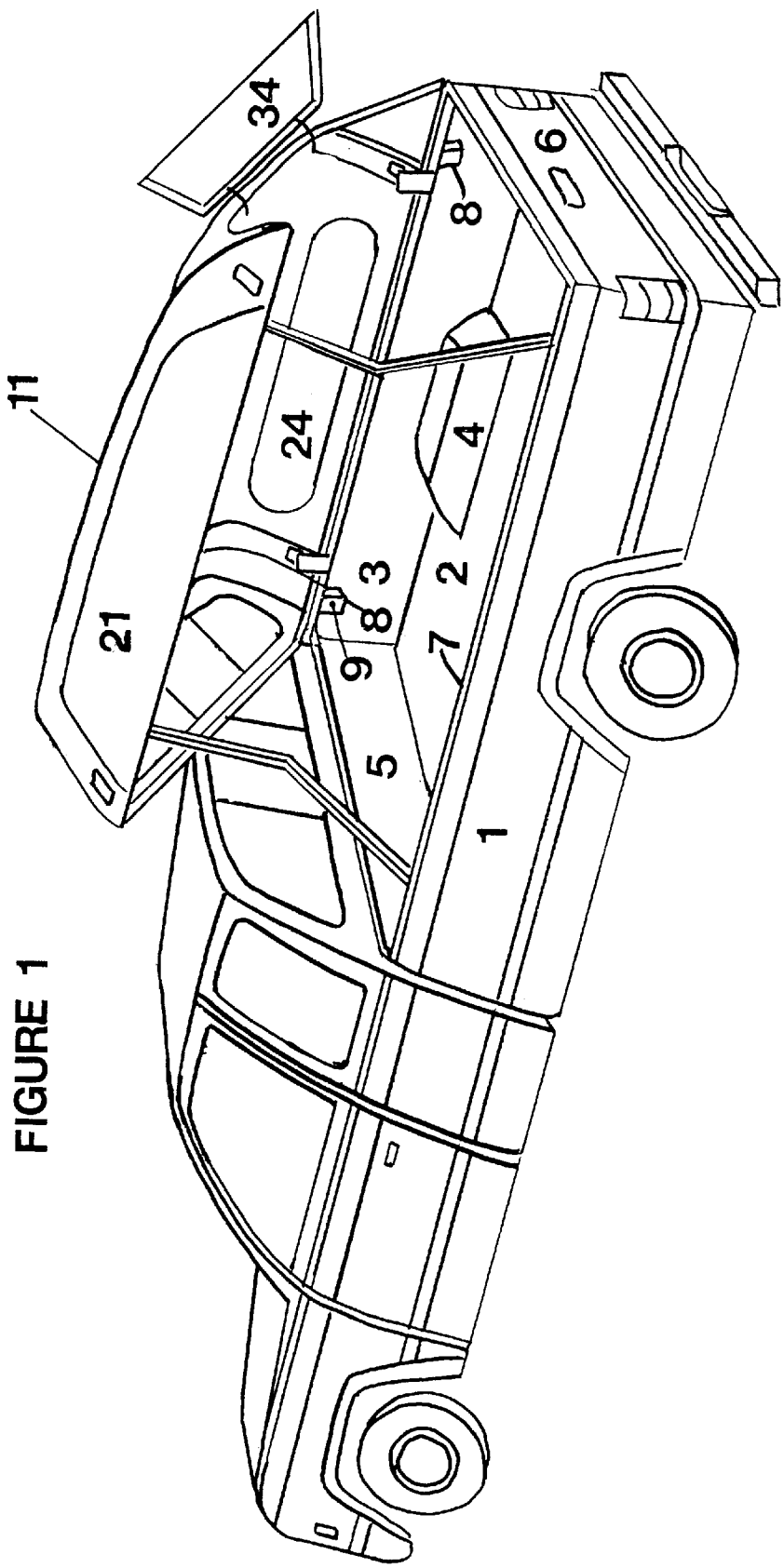
FIG. 1 is a perspective view of the cap of the present invention attached to a truck bed and in the open position.
Figure 2:
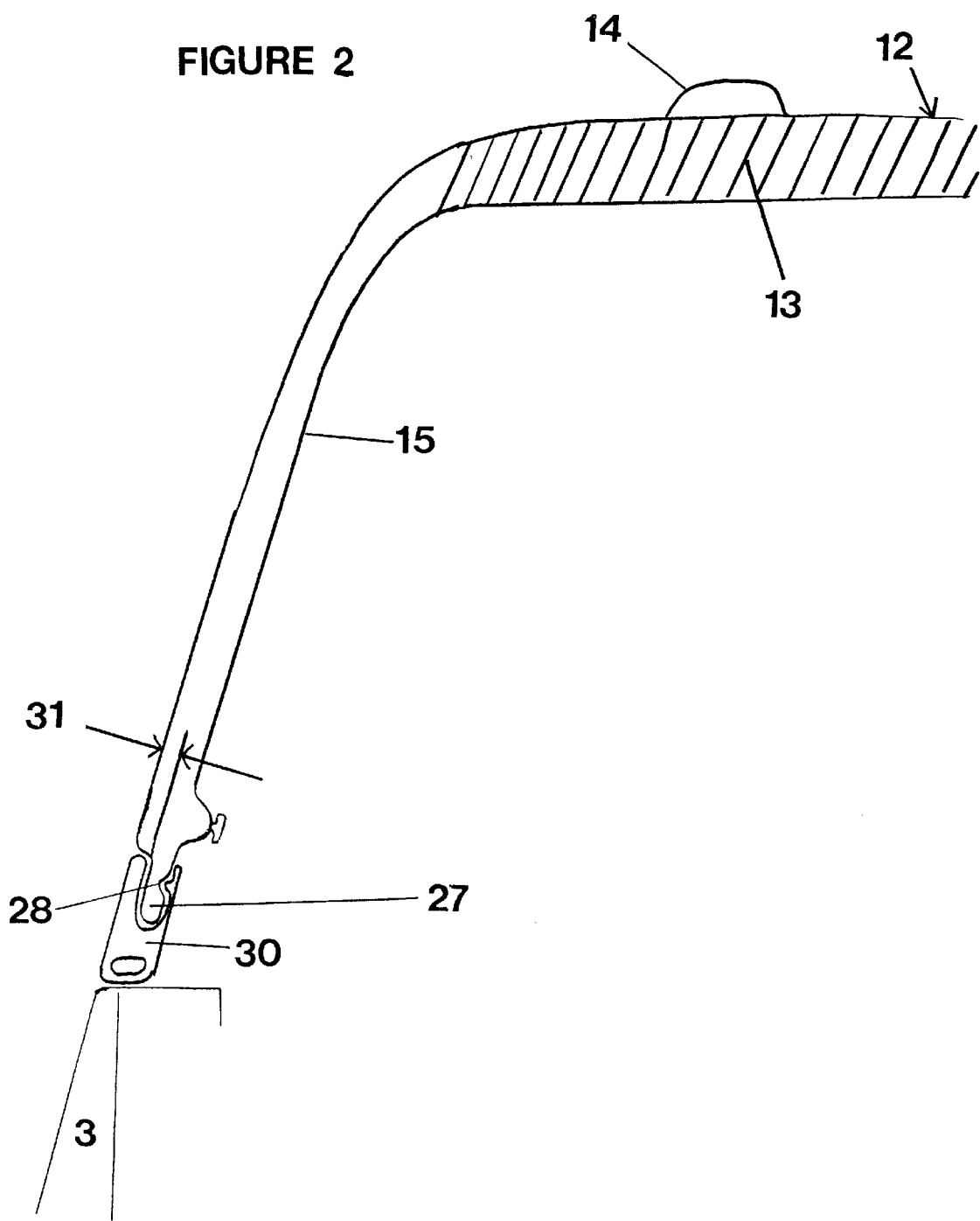
FIG. 2 is a cross section of the cap seal, wall and roof sections and box wall section.
Figure 3:
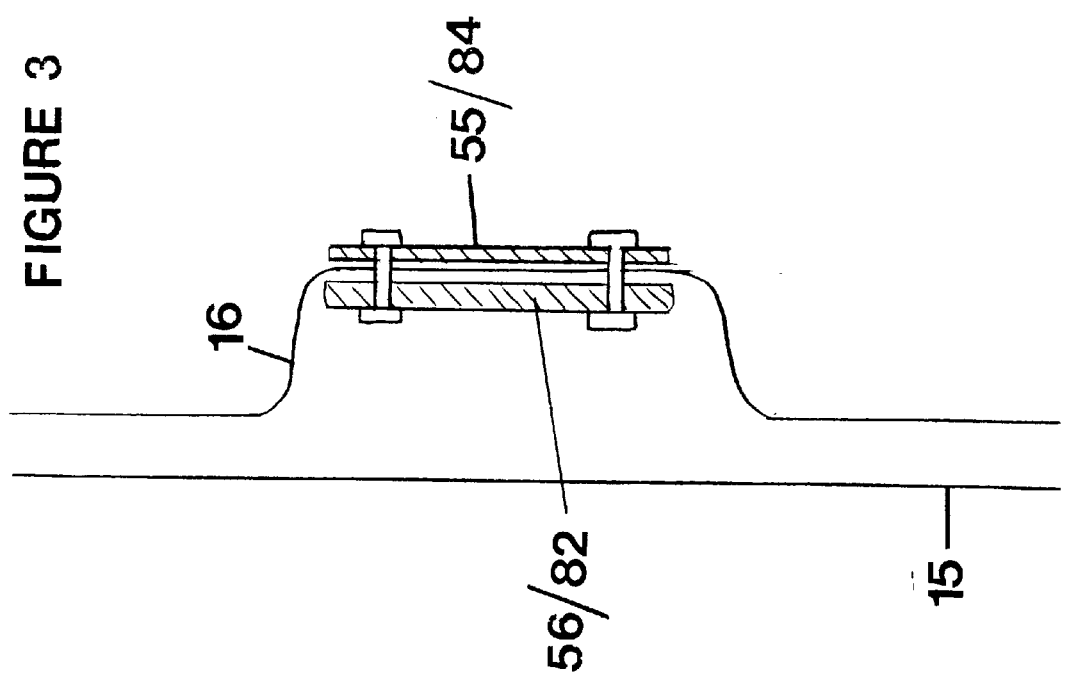
FIG. 3 is a cross section of the hinge and lift arm attachment plates mounted on a cross section of the cap internal rib.
Figure 4:
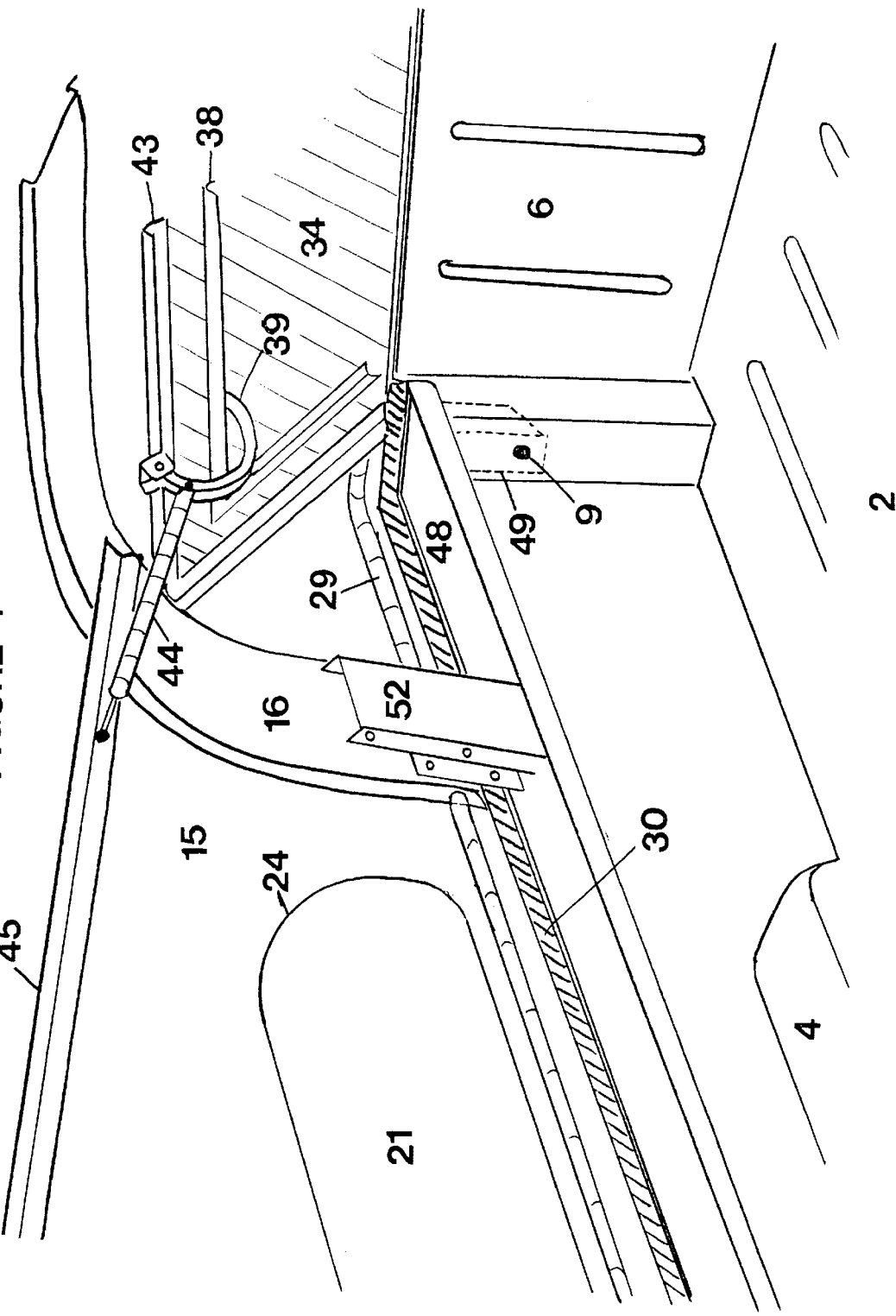
FIG. 4 is a perspective view of the hinge in the closed position and the internal hinge and frame of the rear back door and the corresponding box section.
Figure 9:
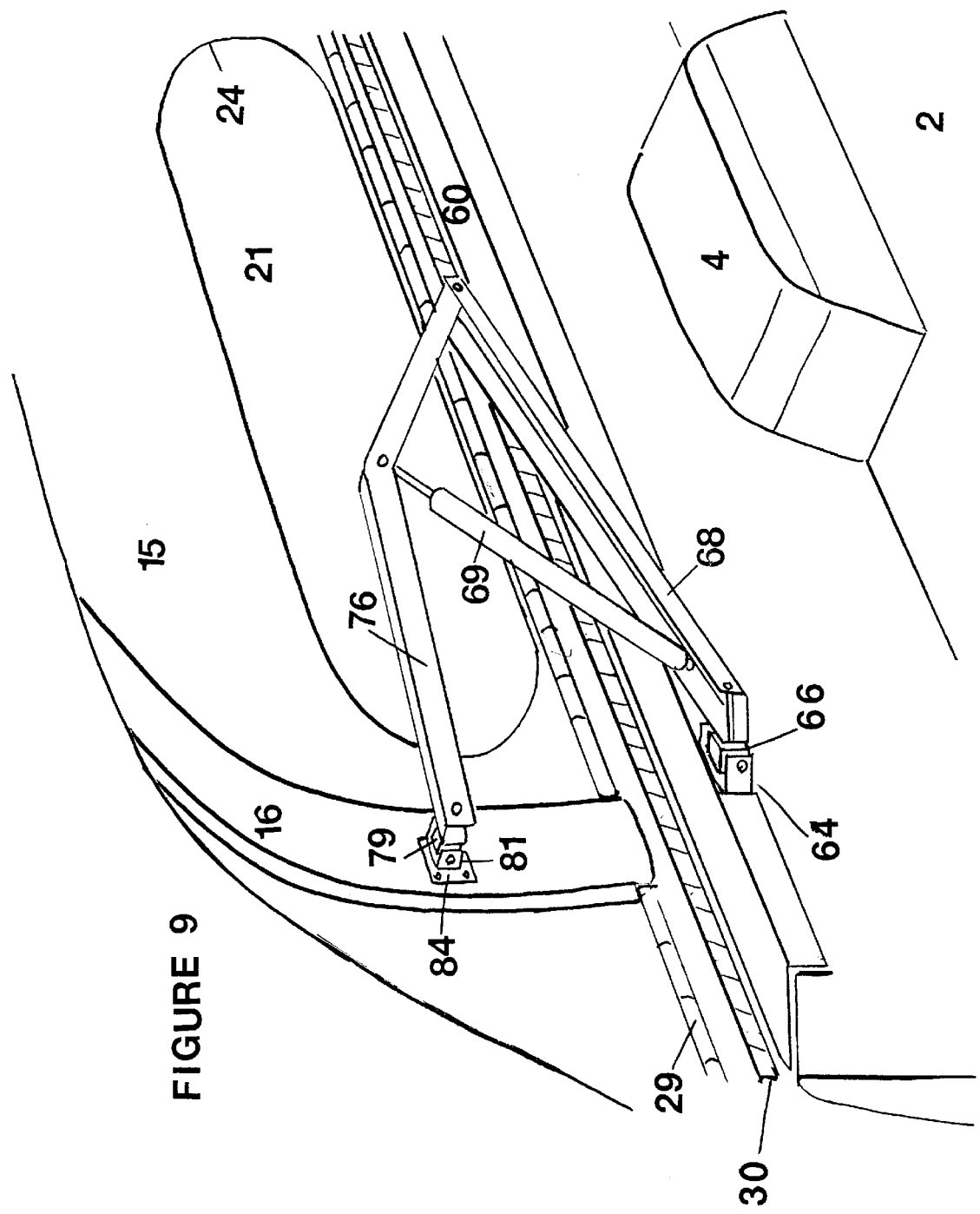
FIG. 9 is a perspective view of the lifting arm.
Figure 10:
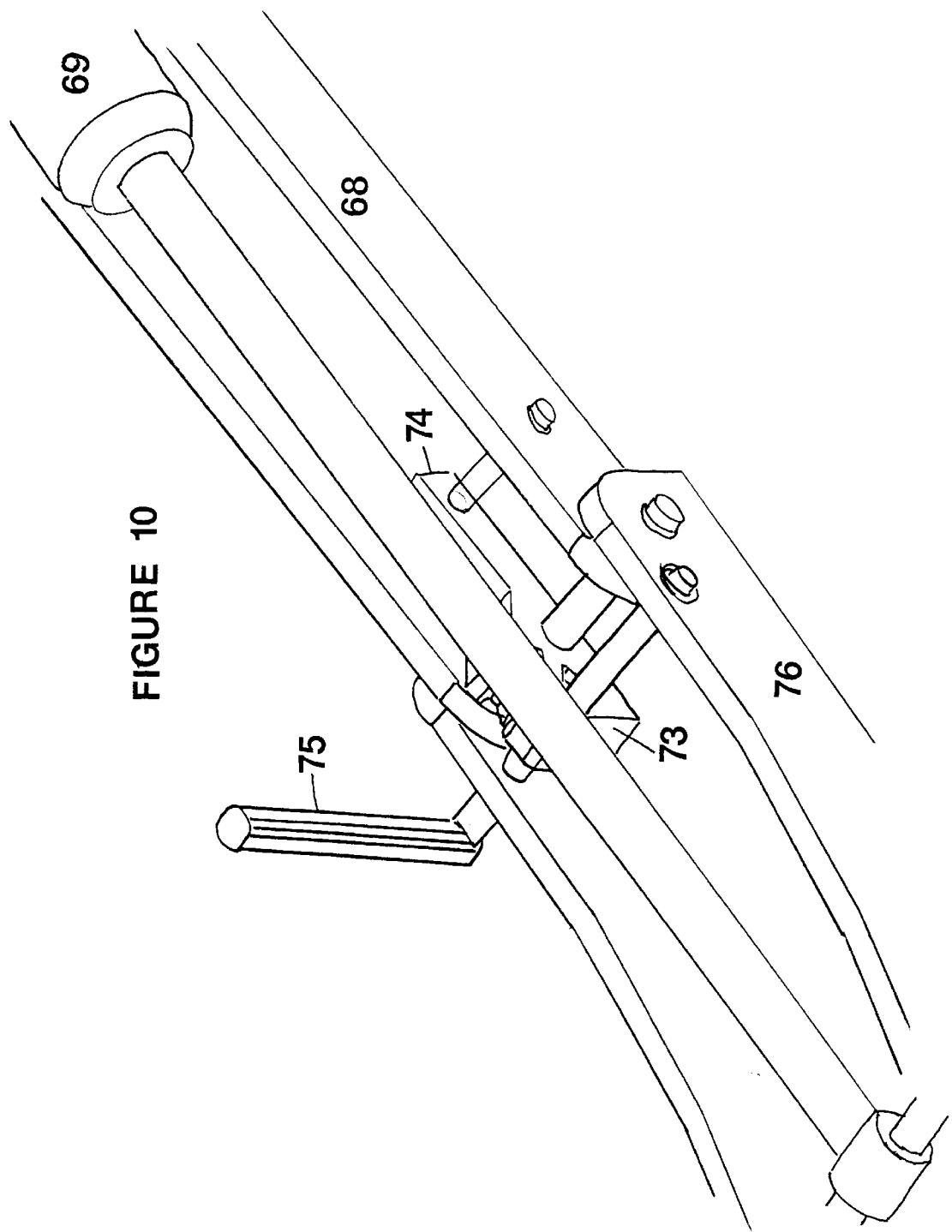
FIG. 10 is a perspective view of the lift arm ratchet in the lift arm's extended most position.
Figure 11:
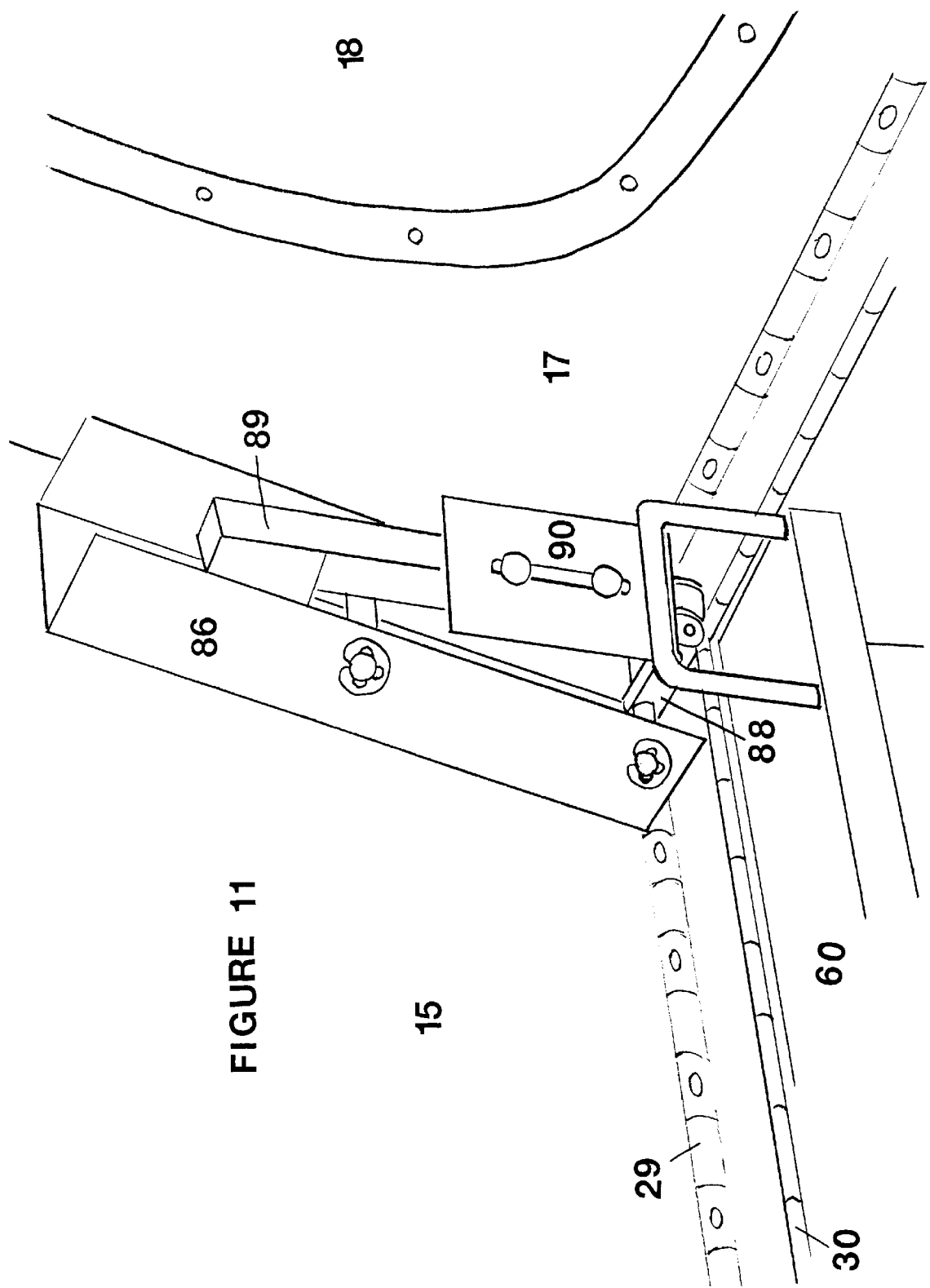
FIG. 11 is a perspective view of the latch in the cap closed position
Figure 12:
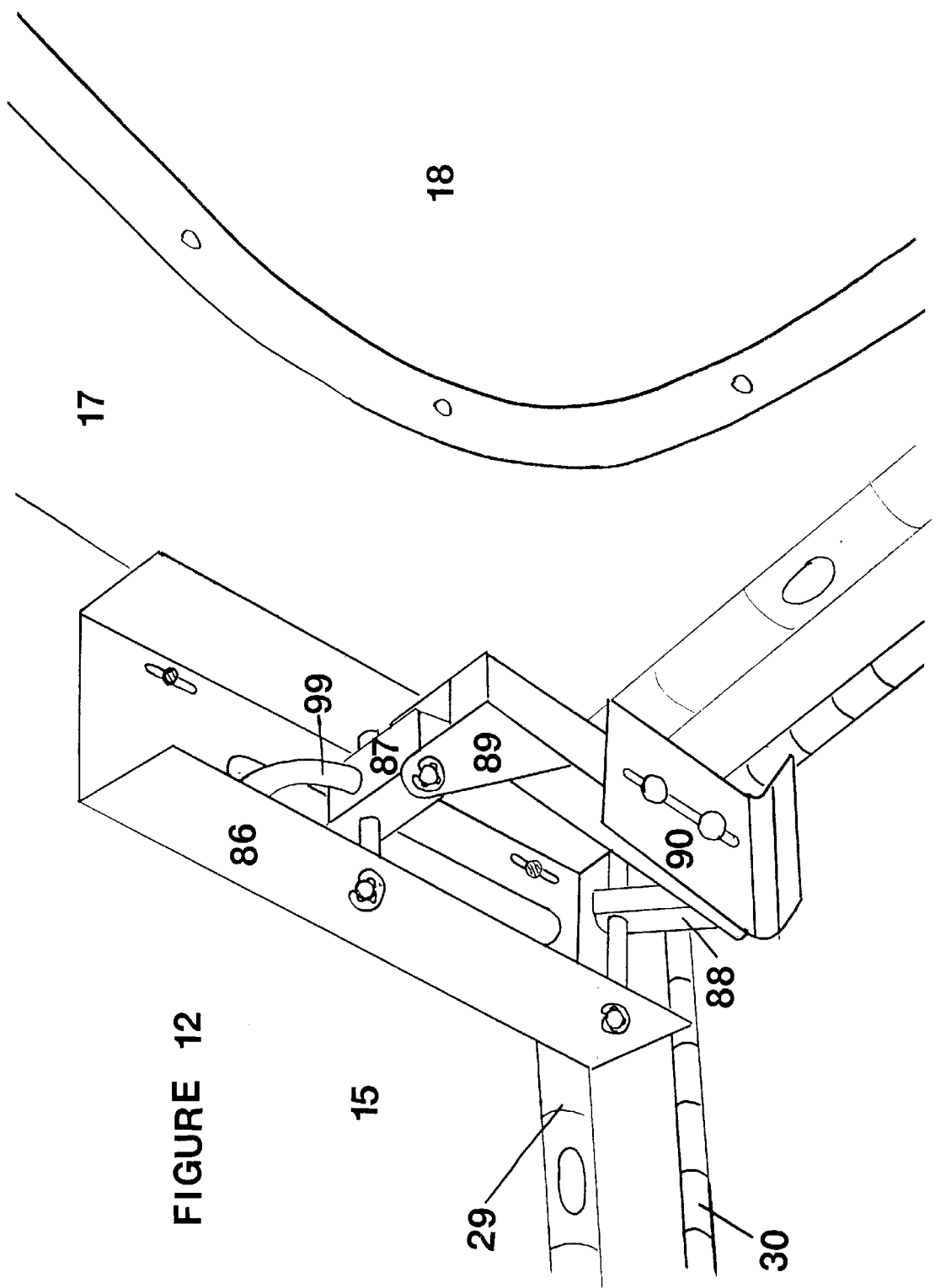
FIG. 12 is a perspective view of the latch in the cap open position.
Figure 13:
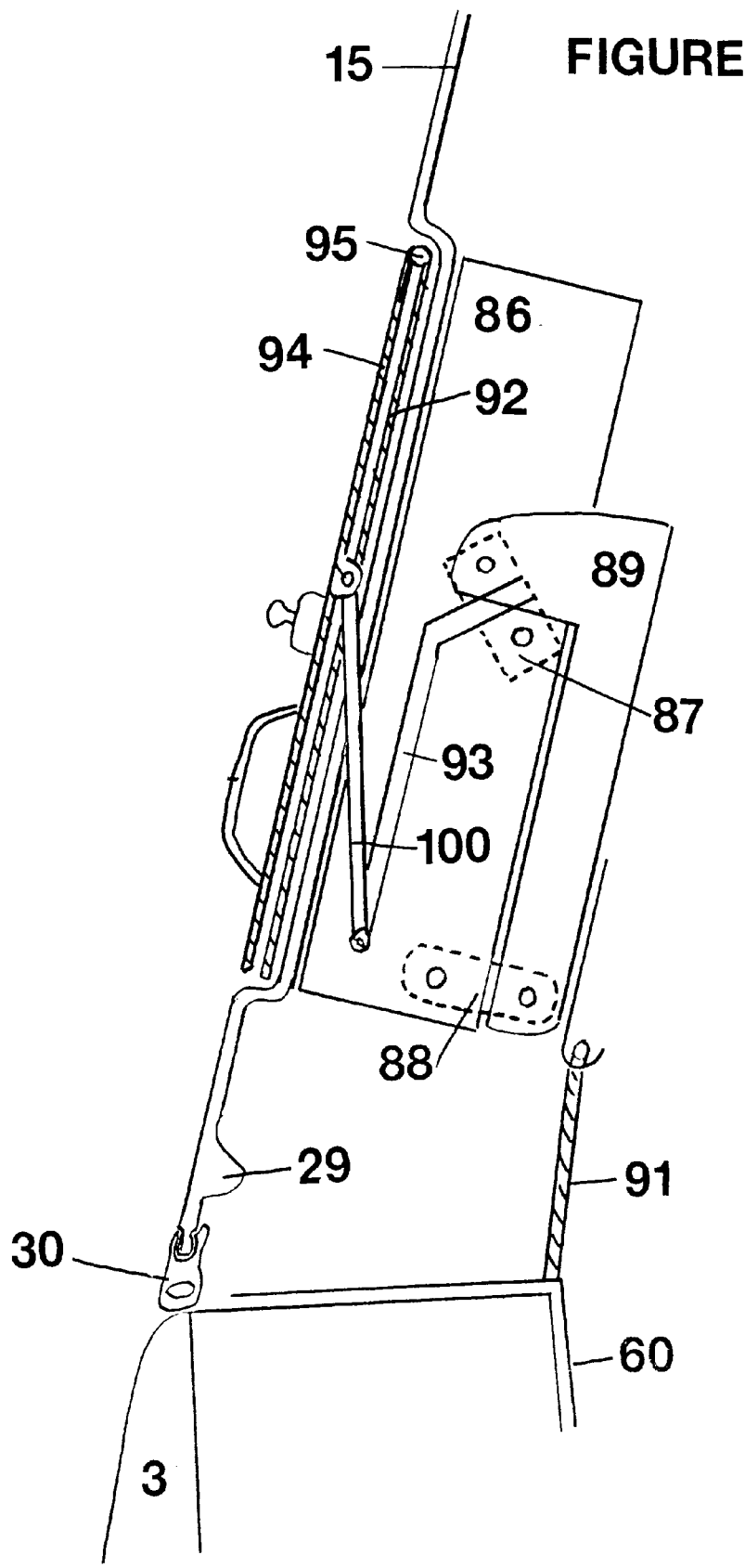
FIG. 13 is a cross sectional view of the latch in its closed position and the corresponding truck box section and the lift arm rail.
Figure 14:
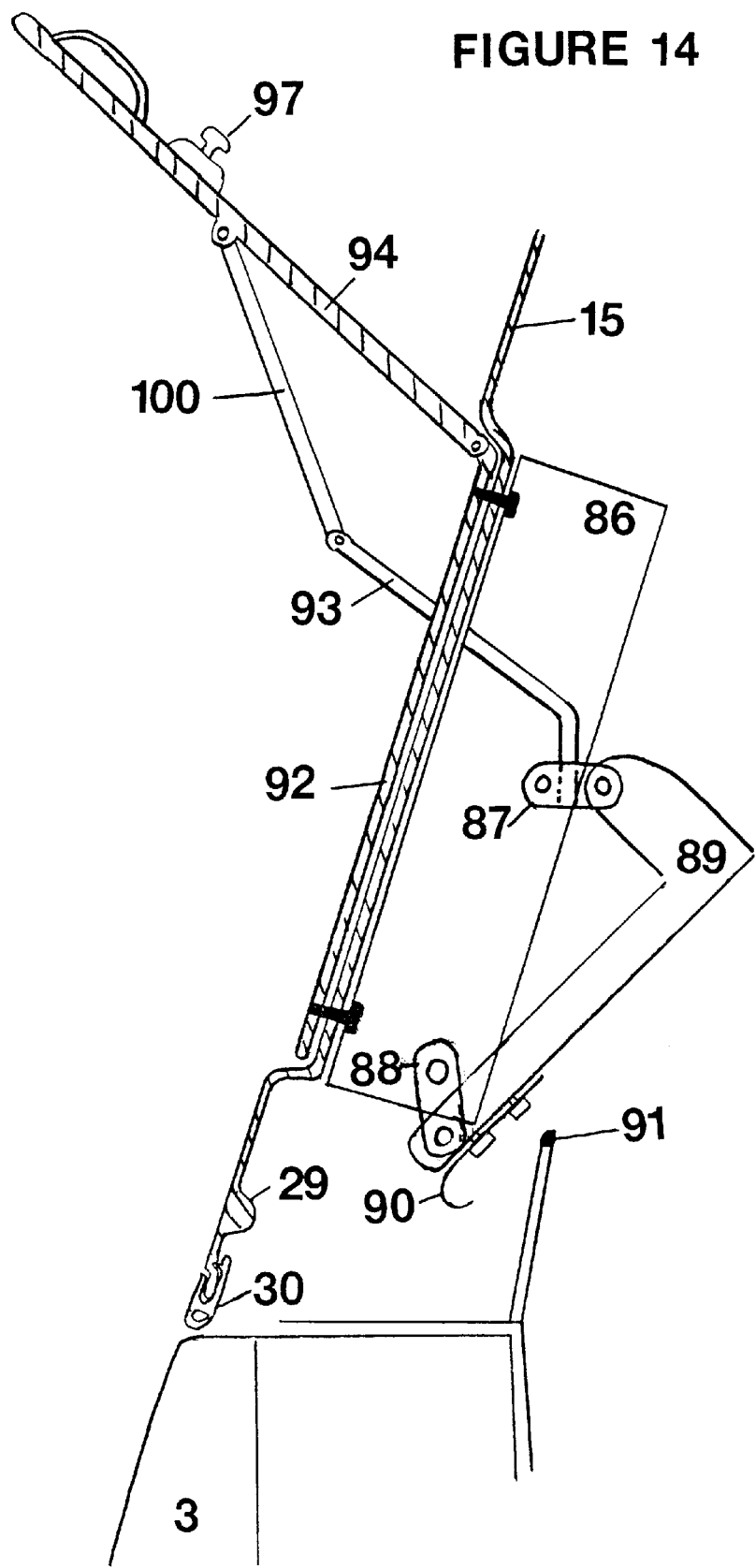
FIG. 14 is a cross sectional view of the latch in the open position mounted on a cap in the closed position and the corresponding truck box section and lift arm rail.
Figure 15:
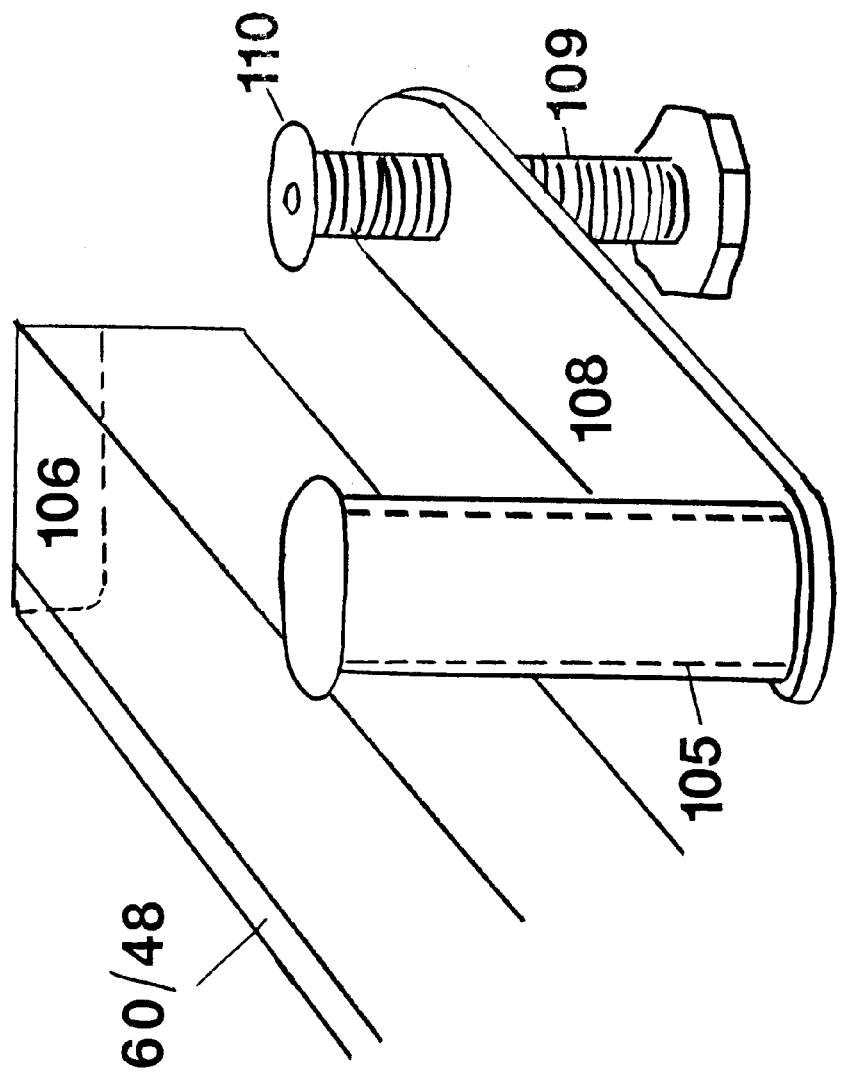
FIG. 15 is a perspective view of the clamp for a truck without stake pockets.
Figure 16:
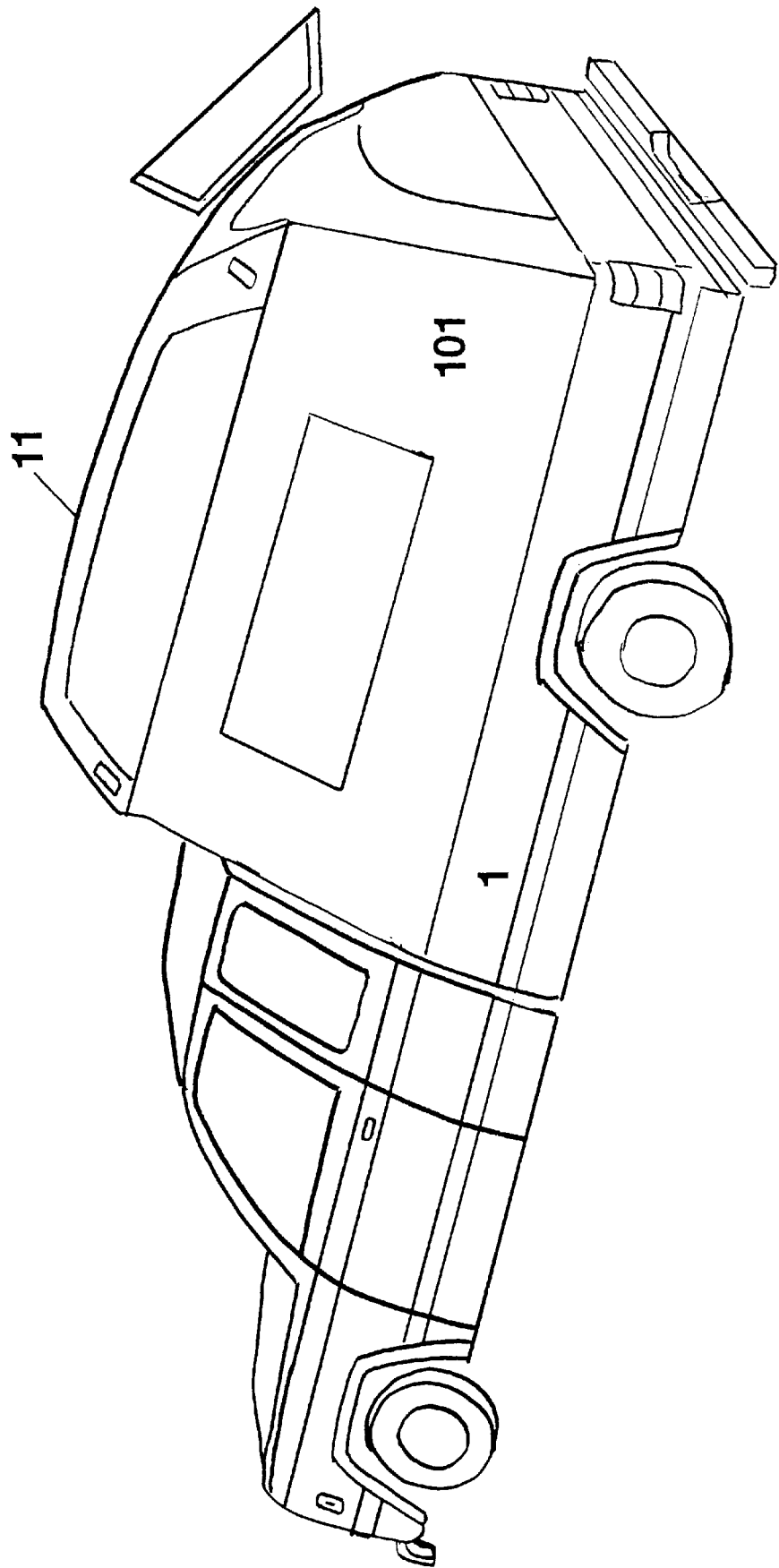
FIG. 16 is a perspective view of an alternate embodiment of the truck cap of the present invention, employing a fabric cover between the perimeter thereof and the truck box.

Referring to the drawings, the cargo box 1 of a pickup truck includes a box floor 2 upwardly extending from which are side walls 3, wheel wells 4 and a front wall 5. The cargo box is accessible through rear tail gate 6. Around the upper perimeter of the cargo box is an upper rail 7 in which are located stake pockets 8. The stake pockets are square recesses extending downwardly from the upper rail 7 along the inside of the side wall 3. A transverse hole or holes 9 are provided through the interior of the wall 3, intersecting the lower part of the stake pocket.

The side access truck cap 11 of the present invention is downwardly opening with a roof 12, two opposing parallel sidewalls 15 and a front wall 17. The perimeter around the sidewalls 15 and front wall 17 ends as a flange 27 with a recess 28 to which a perimeter seal 30 is attached. The cap is molded to allow for a perimeter seal recess 31 so that the perimeter seal is flush with the cap exterior surface. There is no rail section on the cap of the present invention allowing the caps to stack for storage and shipping efficiency.

The cap has front window 18, rear window 34 and side windows 21. The side windows 21 are mechanically attached to the cap with glue and/or bolts which pass through grommets to allow for expansion and contraction of the side window 21 and may or may not open. The method of attachment of the side windows 21 allows their inherent strenght to increase the strength of the cap 11. The side window cut-outs 24 are oval in shape. The oval shaped cut-out is stronger than a square cutout. Square cut-outs incur stress concentrations in the corners.

Protruding from and running from near the rear section to the front section of the roof of the cap are longitudinal external roof ribs 14. The ribs provide for structural reinforcement of the cap 11 and as a mounting position for roof loading. The inside surface of the cap is also provided with internal ribs 16 protruding downward into the enclosure and located laterally from one bottom side to the other across the roof. The combination of longitudinal and lateral ribs makes a lattice effect which torsionally stiffens the cap causing the cap front and cap rear to raise and lower at the same time when the cap is raised or lowered. This provides for accurate alignment of latches and prevents twisting of the cap during its up and down motion.

The internal lateral roof ribs 16 are located to provide for an attachment point for both the hinges and the lift arms. Steel plates 56,82 are inserted into the inside of the rib during manufacture of the cap to which the hinge base plates 55 and lift arm plates 84 are attached. The fibreglass is sandwiched by a plate on either side which is the strongest method of attachment to fibreglass. This method of attachment allows for no protrusions through the cap wall and a completely flush exterior surface. The rib may be filled with expanding foam should additional rigidity be required.

The cap is additionally reinforced with a wood core perimeter rib 29 around the lowermost edge of the cap and around the back window opening. The perimeter rib 29 provides additional stiffness to the cap and the wood core allows for internal attachment of grommets to hold the flexible covering 101 in place when the cap is in its uppermost position.

The cap roof is additionally reinforced with the use of a foam or honeycomb core 13 in the roof section to provide for a separation of fibreglass layers. The core adds to the overall stiffness, rigidity and strength of the cap 11 and increases torsional strength. The cap roof 12 is shaped to slope downwards as much as possible without limiting vision through the rear window 34 as seen through the rear view mirror. The slope increases substantially at the rear window 34. The increased slope of the rear window adds to the strength of the back corners of the cap 11, gives the operator horizontal and vertical access to his cargo at the back of his box 1 when it is not necessary to raise the entire cap. The gradual slope of the cap roof 12 and the large slope of the rear window 34 decreases aerodynamic drag, increasing fuel economy. The gentle slope of the roof 12 adds to the strength of the cap as compared to a flat roofed cap, thus decreasing overall cap weight which decreases overall cap cost and increases fuel economy.

The rear window 34 is attached to a frame 38 running parallel to its uppermost edge and parallel to both sides by bolts passing through rubber grommets to allow for expansion and contraction of the glass. The frame 38 is in turn attached to two curved rods 39 which are pivotally connected by a pin 40 to a frame 43 located on the inside of the cap around the perimeter of the rear door cutout. The rear door seal is shaped to be mounted sandwhiched between the capdoor frame 43 and the cap 11 itself and to seal between the rear window 34 and cap 11. Two internal roof racks 45 are mounted to the internal roof ribs 16. Two gas springs 44 are pivotally attached to the curved rods 39 on one end and pivotally attached to the internal roof racks 45 on the other, effectively counterbalancing the rear glass door for ease of operation and to hold the glass door in its uppermost position. Two locks located at the bottom corners of the rear window 34 keep the rear window in its closed position. This method of attachment provides for a completely flush exterior surface with no external hinges. Security is enhanced by this method of attachment and hinging as compared to conventional exterior hinges which could be compromised by the release of the hinge pin.

The cap 11 is hingedly attached along one side of the cap using two 4 barrel hinges. The base plate of the hinge 52 is welded to the hinge rail 48, which is mounted juxtaposed to the box rail 7 so that the base plate 52 is approximately parallel to the cap side wall 15. Welded to the bottom of the hinge rail are two stake pocket inserts 49 which slide into the stake pockets 8 and are held in place by bolts. A seal 50 is placed between the box 1 and the hinge rail 48. Upper 54 and lower 53 hinge arms are pivotally attached to the base plate 52 at one end and pivotally attached to the cap plate 55 at the other. The lengths of the arms 54,53 and their pivot positions on the base plate 52 and cap plate 55 are chosen to allow for maximum angular travel of the cap. Initially, the cap must travel in a direction with some horizontal travel which restricts it from vertical travel when the cap is in its closed position. This is important because it stops the cap from travelling vertically on the truck when the truck is going over bumps. The width of the hinge arms 54,53 are less than the internal width of the base plate 52. The arms are mounted on pivot pins and kept in a central position by bushings. The purpose of the forgoing lesser widths of the arms and the cap plate is to allow the hinge to fold into itself thus restricting the amount it protrudes into the enclosed area. When closing, partial vertical travel of the cap near its closed position allows for compression of the cap seal 30. The hinge-cap plates 55 are mounted to the internal roof ribs 16. Two plates 56 on the inside of the roof ribs allow for compression of the fibreglass, the strongest method of attachment to fibreglass. The hinge is mounted entirely on the wall section of the internal ribs 16 allowing the caps to stack for ease of shipping and manufacture.

On the opposite side of the box, from the hinge side, there is provided a lifting rail 60, formed of steel and the lifting rail 60 mounts juxtaposed to the box rail 7. A rubber seal 61 is mounted between the lifting rail 60 and the box rail 7. The seal 61 protects the exterior surface of the box rail 7. Protruding downwardly from the lifting rail 60 is a stake pocket insert 62 such that the insert fits snugly into the stake pocket 8. Flush mounted into the side of the lifting rail stake pocket insert 62 is a nut in a position such that it aligns with the stake pocket hole 9. A bolt passes through the stake pocket hole 9 and into the nut such that it affixes the lifting rail to the box rail.

Mounted on the side of the lifting rail 60 at positions vertically aligned with the internal roof ribs 16 are U brackets 64. Pivotally mounted inside the U bracket 64 by a pin 65 is a swivel block 66, held in place by a clip, with swivel block 66 outside dimensions slightly less than the inside dimensions of the U bracket 64. The U bracket 64 and swivel block 66 together make a universal joint to which the lift arm lower link 68 is pivotally attached by a pin 67. The position of the holes in the U bracket 64 and swivel block 66 are chosen to allow for appropriate movement of the lift arm through its full cycle lifting and lowering the cap.

The lifting arm is comprised of a lower link 68 and an upper link 76 and a gas spring 69. The lower link 68 is of channel material such that the exterior dimensions of the channel are slightly smaller than the interior dimensions of the upper link 76. The end of the lower link 68 fits into the end of the upper link 76 and the two links are pivotally attached to each other by a pin and the pin is held in place by a clip. Inside the lower link 68 is a ratchet insert 74 and mounted on the upper link 76 is a ratchet tab 73. When the arm is in one of several predetermined positions, including the extendedmost position of the arm, with the cap fully open, the tab 73 catches the ratchet 74 and locks the arm thus preventing premature closing of the cap. The tab is connected by a bolt through the side of the arm to a handle 75 that is spring biased toward a closed position to maintain the tab in a locked position. To unlock the tab 73 from the ratchet 74, the handle is pressed to an open position, moving the tab 73 out of engagement with the ratchet 74.

The lift arm upper link 76 is bent at an angle. The size and location of the angle affects the overall lifting force of the arm. The lifting force of the arm is such that it as close as possible matches the force required to lift a cap of given dimensions. The arm generates a force less than that required to lift the cap when in the closed position. When the cap is raised partially, it is preferable that the arm generates more force than the force required to lift the cap and the cap may lift on its own. Due to the nature of gas springs having less force in colder temperatures, the force properties of the arm decrease as temperature decreases and the arm in colder temperatures assists the lifting of the cap requiring the operator to provide some small lifting force to lift the cap to its fully raised position. An operator may substitutes stronger springs during winter months to compensate for the loss of gas spring pressure in colder temperatures.

The gas spring 69 is pivotally attached to the lower link 68 by a pin which passes through a hole and held in place by a clip. The gas spring 69 is pivotally attached to the upper link by a pin which passes through a hole and held in place by a clip. The gas spring 69 is attached to the upper link 76 near the angle and to the lower link 68 at the position corresponding to the end of the gas spring 69 in its fully extended position and the arm in its fully extended position. Two sets of holes are provided for as an adjustment to the overall force created by the arm.

The upper link 76 is pivotally attached to a swivel block 79 by a pin and held in place by a clip. The swivel block 79 is pivotally attached to a U bracket 81 by a pin and held in place by a clip. The U bracket 81 is attached to a plate 84 which is attached to the rib 16 on the inside of the cap 11. Inside the rib 16 is a plate 82 of size similar to the U bracket plate 84 and the two plates sandwhich the fibreglass of the rib. The U bracket 81 and swivel block 79 act as a universal joint allowing the arm appropriate movement in three dimensional space for the arm while lifting and lowering the cap. The mounting of the U bracket plate 84 to the internal roof rib allows for ease of manufacture with no protrusions through the outside of the cap 11.

The cap is held in its closed position by a latch assembly. The latch mechanism is a four barrel linkage with overcentre action and positive locking capability. The latch mechanism is accessible from the outside of the cap. The main linkage is comprised of a base plate 86, upper link arm 87, lower link arm 88 and latch plate 89.

The base plate 86 is attached to the cap by bolts which pass through longitudinal holes in the base plate (to allow for adjustment) and the cap into the attachment plate 92. The two plates 86,92 sandwich the fibreglass of the cap. This is the strongest way of attaching the latch to fibreglass. The load is spread to the size of the plates. A longitudinal hole through the attachment plate 92 and the base plate 86 passes from one end to the other.. The hole allows passage of the activation arm 93 and latch cover linkage 100 from inside the cap to the outside of the cap. The latch cover linkage 100 is pivotally mounted to the latch cover 94 and to the activation arm 93 through slots machined through each end, by pins.

The attachment plate cover 94 hinges to the attachment plate 92. A lock 97 keeps the attachment plate cover 94 locked down to the attachment plate 92 to provide security from other people opening the cap.

The upper link arm 87 and lower link arm 88 attach pivotally to the base plate 86. Equal spacers are mounted on either side of the link arms 87,88 to centre the link arms within the channel section of the base plate 86. Holes and pins allow for rotational movement of the link arms 87,88.

The upper link arm 87 is square in cross section. Two holes at the ends of one plane allow for pivotal attachment to the base plate 86 and the latch plate 89. The activation arm 93 passes through a hole in the centre of the other plane of the upper link arm 87.

The latch plate 89 consists of a square cross sectional bar with two tongs at each end. The upper tongs are plates welded onto the bar. The lower tongs are created by machining out the bar. Each set of tongs have a hole passing through them. The upper and lower link arms 87,88 are pivotally attached to the latch plate 89 by a pin through a hole passing through the tongs. The latch hook 90 is mounted to the attachment plate by bolts passing through longitudinal holes to allow for height adjustment.

The geometry of the latch from open position to closed position allows for firstly mostly horizontal travel of the latch hook 90 over to the latch catch 91 then mostly vertical travel to pull the cap 11 down onto its seal 30. The horizontal travel is determined by the amount of travel needed to allow the cap 11 to pass by the latch catch 91 when opening and allow the latch hook 90 to align with the latch catch 91 when closing the latch. The vertical travel is determined by the amount of compression needed to effectively seal the cap. The geometry of the latch allows for the line between the holes which attach to the latch arms 87,88 in the latch plate 89 to pass over the line between the holes in the base plate, which attach to the latch arms 87,88 when latching. This creates what is known as over centre action of the latch when in its closed position preventing the cap from bouncing open when in its closed position.

The geometry of the latch provides for positive locking action. The latch plate cover must be opened before the handle can pass from the inside of the cap to the outside of the cap.

In the case of application to a truck body in which no stake pockets are provided, the rails 48,60 are formed such that at the ends, two tabs 106 will be formed and bent downwards to prevent forward and backward sliding of the rail. The rail in such a case has a round tubular section 107 welded onto the side of the rail. A shaft 105 at one end is attached to a flat tab 108. The shaft 105 passes through the tube 107 and is held in place by a clip. A hole passes through the other end of the tab and threads are tapped into the hole. A bolt 109 passes through the tapped hole. A washer 110 is pressed onto the end of the bolt. To attach the rail to the truck with no stake pockets, the clamp is rotated under the rail and tightened.

The present invention also provides for a flexible fabric enclosure 101 which may be removably attached between the lowermost edge of the cap 11 and the upper edge of the box 1. Attachment of the enclosure to the cap and box may be by any suitable fastening means such as snap fasteners or velcro strips. A zipper is provided for access into the enclosure. A screen may be employed to provide ventilation through the fabric enclosure.

It is understood that the examples described above are not meant to limit the scope of the present invention. It is expected that numerous variants will be obvious to the person skilled in the field of the present invention without any departure from the spirit of the invention. The appended claims, properly construed, form the only limitation upon the scope of the invention.

We claim:

1. A truck box cap comprising:

an enclosure hingedly attached along one side thereof to a corresponding side wall of said box and provided with an assist device to lift said enclosure from its closed position, further characterized in that the enclosure is provided with a pair of latches to keep the enclosure in its closed position, said latches further characterized by a four-bar barrel linkage, said latches further characterized by providing overcentre action in their closed position, said latches further characterized by a linkage passing through the cap wall to a latch cover plate so that an operator may access the latch from the outside of the cap.

2. A truck box cap comprising:

a cap with roof, sidewall, and front wall, a lower edge of said side and front walls having an inwardly projecting arcuate stiffening rib, a section thickness of a lower flanged edge of said side and front walls being of reduced thickness relative to a thickness of said respective side and front walls, forming thereby an undercut shoulder, wherein a seal mounted to said flanged edge is substantially flush with an outer surface of the side and front walls and wherein the lower edge of the cap allows stacking efficiency.

3. A truck box cap comprising:

a cap for covering a truck box, a hinge rail for mounting to the truck box, at least one base plate upwardly extending from the hinge rail, at least one cap plate mounted along a cap sidewall, upper and lower hinge arms each pivotally connected to the at least one base plate and the at least one cap plate about axes longitudinally aligned with the hinge rail.

4. The truck box cap of claim 1, 2, 3 further comprising a flexible fabric depending from said cap, and means attached to the fabric for securing the fabric to the cap and truck box.

5. The truck box cap of claim 3, further comprising a clamping member attached to the hinge rail for attachment to the truck box.

6. The truck box cap of claim 3, further comprising a lifting rail and a clamping member attached to the lifting rail for attachment to the truck box.

7. The truck box cap of claim 1, further comprising a lock mounted to the latch cover plate.

* * * * *